United States Patent [19]

Hull et al.

[11] Patent Number: 4,998,327
[45] Date of Patent: Mar. 12, 1991

[54] TRACTION HOOK AND ROPE LOCK

[76] Inventors: Harold L. Hull, 401 Canyon Way #43, Sparks, Nev. 89434; Kenneth W. Buethe, 906 Humboldt, Reno, Nev. 89509

[21] Appl. No.: 507,634

[22] Filed: Apr. 11, 1990

[51] Int. Cl.⁵ .................................................. F16G 11/00
[52] U.S. Cl. ........................... 24/134 R; 24/132 WL; 24/134 L
[58] Field of Search .......... 24/134 R, 134 L, 134 KB, 24/132 WL, 68 CD:573.5

[56] References Cited

U.S. PATENT DOCUMENTS

| | | | |
|---|---|---|---|
| 193,595 | 7/1877 | Bradley | 24/132 WL |
| 1,725,324 | 8/1929 | Whitehead | 24/134 L |
| 3,960,149 | 6/1976 | Bujan | 24/132 WL |
| 3,967,349 | 7/1976 | Christensen | 24/132 WL |
| 4,355,441 | 10/1982 | Hall | 24/134 KB |
| 4,465,011 | 8/1984 | Merry | 114/199 |
| 4,567,628 | 2/1986 | Prete | 24/68 CD |
| 4,639,978 | 2/1987 | Boden | 24/134 R |
| 4,648,483 | 3/1987 | Skyba | 182/187 |
| 4,673,150 | 6/1987 | McSherry | 248/73 |
| 4,790,049 | 12/1988 | Grosh | 24/132 WL |

*Primary Examiner*—Victor N. Sakran

[57] ABSTRACT

A traction hook and rope lock which has a unique locking mechanism wherein accidental release is eliminated. Also this hook and rope lock is unusual in manner due to the fact that it will stay in its locked position even when there is little or no tension applied on the rope. This invention is uncomplicated and easy to use and has promise of being highly efficient when used in hospitals for patients in traction.

8 Claims, 1 Drawing Sheet

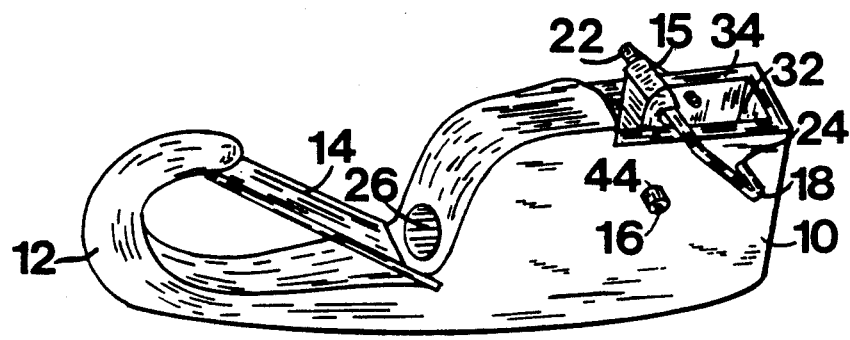
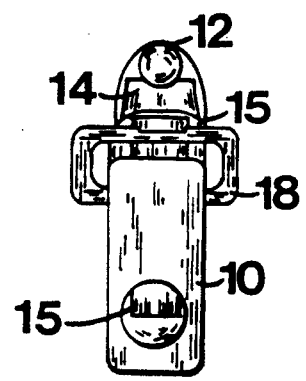
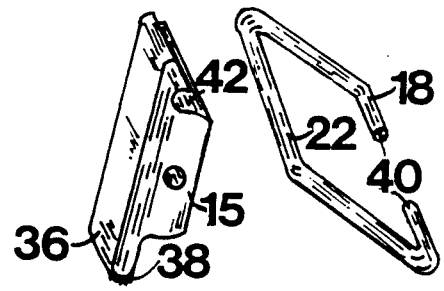
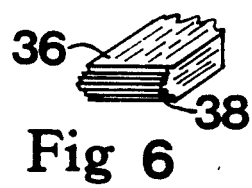
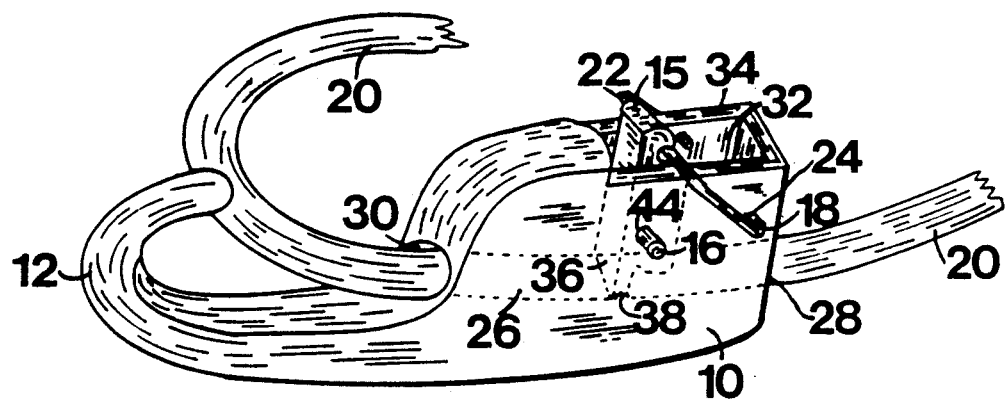

TRACTION HOOK AND ROPE LOCK

This invention relates to rope locks, but more particularly to rope locks which have a hook and are designed for use in hospitals with traction devices used for patients in traction.

BACKGROUND OF THE INVENTION

In the past, many rope locks have been used such as U.S. Pat. Nos. 4,567,628 / 4,639,978 / 4,648,483 / and 4,355,441 however none of these prior art rope locks have proven successful when used for traction patients. The present invention utilizes a unique locking mechanism wherein accidental release of the locking apparatus is eliminated as this locking mechanism is secure and allows the proper amount of tension to be adjusted for the individual patient. Prior art rope locks tend to release themselves when less tension or no tension is applied to the rope. In the present invention the lock is secure no matter what tension is applied. Also these prior art rope locks tend to be complicated and inconvenient for use by nurses who are on a time schedule and have little or no time to waste. At the present time nurses simply tie the rope to the bedside and hope that the desired amount of pull is achieved. In many cases the doctor must readjust the rope to achieve the desired effect, thus the doctor will need to untie the rope, then again position the rope, retie and hope that the proper amount of tension has been achieved. This tends to be complicated and time consuming for the user. The present invention is easy to use, uncomplicated and has promise of being highly efficient when used for traction patients.

SUMMARY OF THE INVENTION

It is the primary object of the present invention to provide a combination traction hook and rope lock which utilizes a unique locking mechanism which is secure and eliminates accidental release even when there is little or no tension applied to the rope.

It is another object of the present invention to provide a rope lock which is convenient and easy to use by doctors and nurses for use with traction devices for patients in traction.

It is a further object of the present invention to provide a rope lock which is secure, thus eliminating possible further injury due to rope slippage.

Still a further object of the present invention is its easy adjustability.

Other objects and advantages will become apparent when viewed in the light of the following drawings and specifications.

BRIEF DESCRIPTION OF THE DRAWINGS

FIG. 1 is a perspective view of the combination traction hook and rope lock.

FIG. 2 is an end view.

FIG. 3 is a perspective view of a first pivotable member.

FIG. 4 is a perspective view of a second pivotable member.

FIG. 5 is a perspective view of a second embodiment with a partial transparent section showing pivotable members in a locked position with traction rope intact.

FIG. 6 is a perspective view of a rope engaging surface of pivotable member of FIG. 3.

DETAILED DESCRIPTION OF THE DRAWINGS

Referring now in detail wherein like numerals represent like parts, 10 is a main body portion with 12 being a hook, 14 being a flat spring which acts as a retaining means when hook 12 is placed over an object such as a bed-rail (not shown). 15 is a first pivotable member with 16 being a support pin supported by bearings 44 in parallel side walls 34, 18 being substantially a U shaped wire member with its ends 40 turning inward and cooperating with bearings 24 in side walls 34, 42 being an indent in one end of member 15, 36 being a rope engaging surface, 38 being serrations on rope engaging surface, 20 being a typical traction rope with 22 being a common leg of second pivotable member which cooperates with indent 42 of first pivotable member 15 thus locking the device. 24 are support bearings in side walls 34 cooperating with ends 40 of second pivotable member 18.

26 is a channel in body member 10 having an entrance 28 and an exit 30 with the shape of channel 26 being substantially the shape and size of a traction rope with 32 being a cavity in body member 10 having substantially two parallel walls 34.

Now it will be seen that when a doctor or nurse desires to use the rope lock they need only place the traction rope inside the channel (which is designed to receive the rope) and center the rope lock into its desired position, then they simply engage the locking member. Now they have a traction rope lock which is secure and eliminates further possible injury to the patient by accidental rope slippage.

It will also be seen that we have provided a rope lock which is a combination hook and lock.

It will further be seen that we have provided a hook and rope lock which utilizes a unique locking mechanism.

It will also be seen that we have provided a hook and rope lock which is convenient and easy to use.

It will further be seen that we have provided a hook and rope lock which when applied is secure and stays locked even with little or no tension on the rope.

Although the invention has been herein shown and described in what is conceived to be the most practical and preferred embodiments, it is recognized that departures may be made therefrom within the scope of the invention, which is not to be limited to the details disclosed herein but it is to be accorded the full scope of the claims so as to embrace any and all equivalent devices and apparatus.

Having described our invention, what we claim as new and desire to secure by letters patent is:

1. A combination traction hook and rope lock comprising; a body member, said body member having a channel with an entrance and an exit for a traction rope, said body member having a hook on one of its ends, said exit from said channel of said body member being located between said entrance and said hook, said body member having a cavity opening into said channel, said cavity having substantially two parallel side walls, a first pivotable member, said first pivotable member being mounted in said cavity by a support pin, said support pin penetrating substantially the center portion of said first pivotable member with the distal ends of said support pin being supported by said parallel side walls of said cavity, said first pivotable member having a first and second end, said first end having a rope engaging surface, said second end having locking means cooperating with a second pivotable member, said second pivotable member being substantially a wire formed in the shape of a square U with the ends of said wire turning inward toward each other to form a mounting means, said mounting means cooperating with bearing means in said parallel side walls of said body member, said first pivotable member having a locked position and an un-locked position, said first pivotable member when being in said locked position urging said first rope engaging surface of said first pivotable member against said traction rope, whereas said traction rope is held and locked in a secure manner and when said first pivotable member is in its said un-locked position said traction rope is free in said channel.

2. The device of claim 1 in which said channel is substantially round and of a size to contain said traction rope.

3. The device of claim 1 in which said body member and said first pivotable member is made of plastic.

4. The device of claim 1 in which said hook has a retaining means.

5. The device of claim 4 in which said retaining means is a flat spring.

6. The device of claim 1 in which said support pin and said second pivotable member is made of metal.

7. The device of claim 1 in which said locking means of said second end of said first pivotable member is an indent cooperating with the common leg of said substantially square, U shaped second pivotable member.

8. The device of claim 1 in which said first end having a rope engaging surface of said first pivotable member has serrations.

* * * * *